(12) United States Patent
Winkler

(10) Patent No.: US 6,644,332 B1
(45) Date of Patent: Nov. 11, 2003

(54) METHOD AND APPARATUS FOR MULTIPLE-INPUT-MULTIPLE-OUTPUT CONTROL OF A VALVE/ACTUATOR PLANT

(75) Inventor: Richard J. Winkler, Marshalltown, IA (US)

(73) Assignee: Fisher Controls International Inc., Clayton, MO (US)

( * ) Notice: Subject to any disclaimer, the term of this patent is extended or adjusted under 35 U.S.C. 154(b) by 78 days.

(21) Appl. No.: 09/769,582

(22) Filed: Jan. 25, 2001

(51) Int. Cl.[7] .................................................. G05D 7/00
(52) U.S. Cl. .......................... 137/2; 137/487.5; 700/43; 700/67; 700/282
(58) Field of Search ................................ 137/2, 12, 14, 137/486, 487.5, 488; 700/53, 282, 42, 43, 67, 69, 70, 289; 318/610; 60/660

(56) References Cited

U.S. PATENT DOCUMENTS

| | | | |
|---|---|---|---|
| 2,303,891 A | 12/1942 | Moore | |
| 2,706,466 A | 4/1955 | Rosenberger | |
| 2,771,897 A | 11/1956 | Bailey | |
| 3,373,935 A | 3/1968 | Thorburn | |
| 3,384,102 A | 5/1968 | Hickox | |
| 3,413,997 A | 12/1968 | Taylor | |
| 3,598,138 A | 8/1971 | Hadley | |
| 3,935,523 A | * 1/1976 | Cleveland et al. | 318/609 |
| 4,027,145 A | * 5/1977 | McDonald et al. | 290/40 R |
| 4,051,669 A | * 10/1977 | Yannone et al. | 60/39.091 |
| 4,059,128 A | 11/1977 | Heske et al. | |
| 4,086,804 A | 5/1978 | Ruby | |
| 4,154,160 A | 5/1979 | Küsters | |
| 4,456,031 A | * 6/1984 | Taplin | 137/625.62 |
| 4,474,012 A | * 10/1984 | Chamberlain | 60/660 |
| 4,543,973 A | 10/1985 | Ho | |
| 4,546,426 A | * 10/1985 | Hafner et al. | 318/561 |
| 4,638,444 A | 1/1987 | Laragione et al. | |
| 4,679,583 A | 7/1987 | Lucas et al. | |
| 4,724,865 A | * 2/1988 | Hirano et al. | 137/486 |
| 5,020,564 A | * 6/1991 | Thoman et al. | 137/102 |
| 5,059,880 A | * 10/1991 | Hiroi | 318/610 |
| 5,062,443 A | 11/1991 | Maric | |
| 5,197,328 A | * 3/1993 | Fitzgerald | 137/487.5 |
| 5,253,669 A | 10/1993 | Gray | |
| 5,396,923 A | 3/1995 | Allen et al. | |
| 5,431,182 A | 7/1995 | Brown | |
| 5,433,079 A | 7/1995 | Badami et al. | 60/660 |
| 5,493,488 A | 2/1996 | Castle et al. | |
| 5,526,838 A | * 6/1996 | Robert | 137/12 |
| 5,568,022 A | * 10/1996 | Tranovich | 318/566 |
| 5,573,032 A | * 11/1996 | Lenz et al. | 137/486 |
| 5,606,950 A | * 3/1997 | Fujiwara et al. | 123/399 |
| 5,613,514 A | 3/1997 | Tan et al. | |
| 5,616,998 A | * 4/1997 | Sepehri et al. | 318/568.22 |
| 5,623,402 A | * 4/1997 | Johnson | 700/42 |

(List continued on next page.)

FOREIGN PATENT DOCUMENTS

| | | |
|---|---|---|
| EP | 0 604 149 A2 | 6/1994 |
| EP | 0 875 800 A2 | 11/1998 |

OTHER PUBLICATIONS

PCT International Search Report issued in PCT/US02/01441, Sep. 9, 2002.

Primary Examiner—Michael Powell Buiz
Assistant Examiner—Ramesh Krishnamurthy
(74) Attorney, Agent, or Firm—Marshall, Gerstein & Borun LLP

(57) ABSTRACT

A method and apparatus for controlling a valve/actuator plant by generating a plurality of independent correcting control signals each responsive to a plurality of respective input signals and at least one of these input signals being the set point signal. The plurality of independent correcting control signals includes a pneumatic flow signal. The correcting control signals may be derived from all linear control signals, all non-linear control signals, or a combination of linear control signals and non-linear control signals.

13 Claims, 3 Drawing Sheets

U.S. PATENT DOCUMENTS

| | | | | |
|---|---|---|---|---|
| 5,654,885 A | * | 8/1997 | Mayhew et al. | 137/487.5 |
| 5,806,805 A | | 9/1998 | Elbert et al. | 244/195 |
| 5,931,180 A | * | 8/1999 | Nagasaka | 137/487.5 |
| 5,947,086 A | | 9/1999 | Hoshino et al. | 123/399 |
| 5,950,668 A | * | 9/1999 | Baumann | 137/486 |
| 6,035,878 A | * | 3/2000 | Adams et al. | 137/1 |
| 6,115,660 A | | 9/2000 | Berger et al. | 701/50 |

\* cited by examiner

METHOD AND APPARATUS FOR MULTIPLE-INPUT-MULTIPLE-OUTPUT CONTROL OF A VALVE/ACTUATOR PLANT

FIELD OF THE INVENTION

The present invention relates generally to valve controllers and more particularly to a method and apparatus for controlling a valve/actuator plant with multiple independent controller outputs to the valve/actuator plant.

BACKGROUND OF THE INVENTION

A variety of control algorithms may be used by valve controllers to control a valve/actuator plant. Typically, valve controllers use an error signal, which is the difference between the desired set point signal and the output feedback signal, to control the valve/actuator plant. The valve controller generates a correcting control output signal, specifically a pneumatic signal proportional to the error signal, through a control algorithm to drive the valve/actuator plant. The control output signal may be the result of either a linear or non-linear control algorithm. This output signal from the valve controller becomes an input signal to the valve/actuator plant and hereinafter will be referred to as a correcting control signal.

A correcting control signal is generated from a Proportional, a Proportional plus Derivative, or a Proportional plus Derivative plus Integral type linear control algorithm. The Proportional (P) type control algorithm generates a correcting control signal directly proportional to the error signal. The Proportional plus Derivative (PD) type control algorithm generates a correcting control signal that is the sum of a signal proportional to the error signal and a signal that is proportional to the rate of change of the error signal. The Proportional plus Derivative plus Integral (PID) type control algorithm generates a correcting control signal that is the sum of a signal proportional to the error signal, a signal that is proportional to the rate of change of the error signal, and a signal that is proportional to the integral of the error signal.

Non-linear control techniques may compensate for the non-linearities, such as friction, dead band, and hysterisis that are inherent in controlling a valve/actuator plant. One example of a non-linear control algorithm would be one that uses a pulse width modulation technique. This algorithm would provide an "on-off-on" correcting control signal which has a duty cycle that has some defined relationship to the error signal. With this "on-off-on" control algorithm there is a dead-band parameter-that defines the values of the error signal for when the correcting control signal is "off" or zero, and when the correcting control signal is "on" or equal to one.

The correcting control signals from both the linear and non-linear control algorithms can be converted to pneumatic correcting control signals that would be used to drive a valve/actuator plant to the desired set point position. This pneumatic correcting control signal consists of, but is not limited to, a pneumatic flow.

All electro-pneumatic valve controllers use either linear or non-linear control algorithms to provide pneumatic correcting control signals to the valve/actuator plant. Typically, a valve controller provides a single pneumatic correcting control signal to the valve/actuator plant. Accordingly, if the algorithm and/or mechanics used to generate the correcting control signal fails to operate, then the valve controller ceases to function and ceases to provide a pneumatic correcting control signal to the valve/actuator plant.

SUMMARY OF THE INVENTION

In accordance with the principles of the present invention, there is provided a method and apparatus for controlling a valve/actuator plant with multiple independent correcting control signals including correcting control signals derived from linear control signals, non-linear control signals or a combination of linear and non-linear control signals. The correcting control signals may be a pneumatic signal. The multiple correcting control signals operate independent of each other so if one correcting control signal fails to operate, the other correcting control signal or signals will continue to function independent of the failed correcting control signal and still be able to drive the valve/actuator plant.

In accordance with the invention, a plurality of independent correcting control signals are generated, each responsive to a plurality of input signals which include a set point signal. The correcting control signals to the valve/actuator plant are summed together by the pneumatic volume of the actuator providing a single controlled output from the valve/actuator in response to the plurality of independent correcting control signals. This single controlled output is the valve's mechanical travel.

The plurality of independent correcting control signals can be generated by only linear control signals, only non-linear control signals or a combination of linear control signals and non-linear control signals.

A significant advantage of the present invention is in being able to incorporate a plurality of independent linear and non-linear pneumatic correcting control signals to a valve/actuator plant and provide a single controlled output from the valve/actuator plant.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION OF THE PREFERRED EMBODIMENTS

Figure 1:
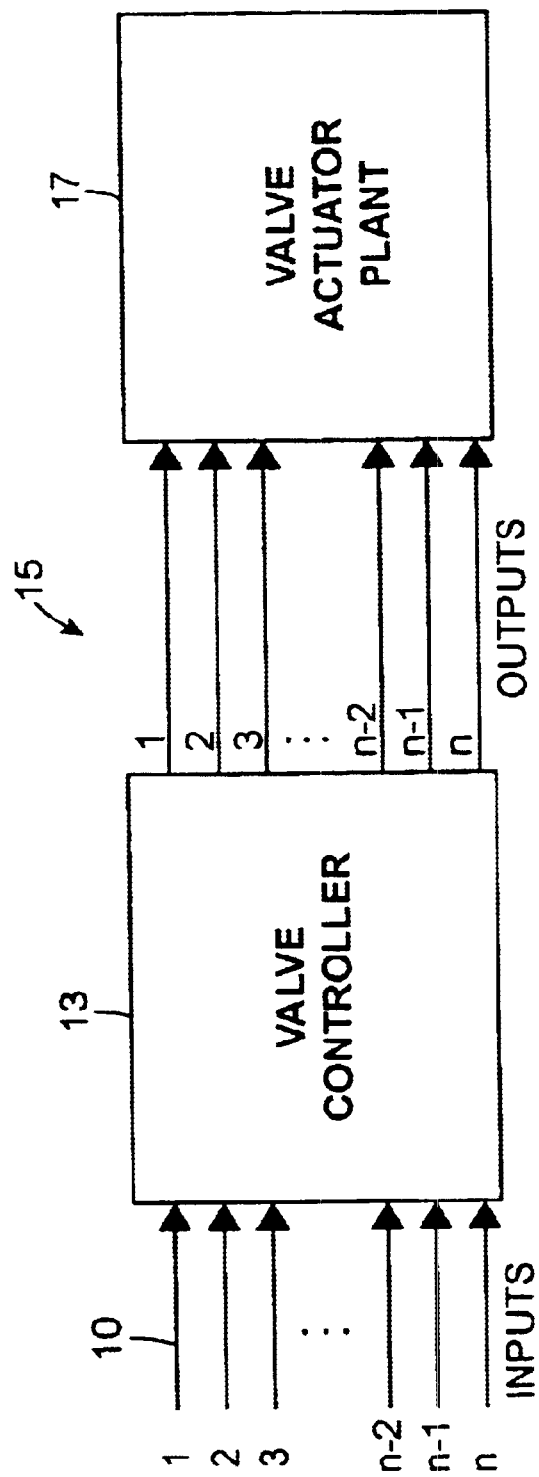
FIG. 1 is a block diagram illustrating a valve controller with multiple-input-multiple-output control.

FIG. 1 illustrates a plurality of control inputs 10, which include, but are not limited to, electronic control inputs, coupled to a valve controller 13 with a plurality of independent correcting control signals 15 to control a valve/actuator plant 17. The plurality of independent correcting control signals 15, which may be a pneumatic signal, is derived from either all linear control algorithms, all non-linear control algorithms, or a combination of linear and non-linear control algorithms. For example, correcting control signals 15/1 through 15/n may be derived from either all linear control algorithms or all non-linear control algorithms. Moreover, correcting control signal 15/1 may be derived from a linear control algorithm and correcting control signals 15/2 through 15/n may be derived from non-linear control algorithms, or correcting control signals 15/1 through 15/n may be derived from any other combination of linear and non-linear control algorithms.

The plurality of control inputs 10 generate a plurality of correcting control signals 15 that are coupled to the valve/actuator plant 17. The plurality of correcting control signals 15 are independent of each other so if one correcting control signal fails to operate, the other correcting control signal or signals will continue to function independent of the failed correcting control signal. For example, if correcting control signal 15/1 failed to operate, correcting control signals 15/2 through 15/n should continue to function and control the valve/actuator plant 17. The valve controller 13 may be, but is not limited to, an electropneumatic controller.

Figure 2:
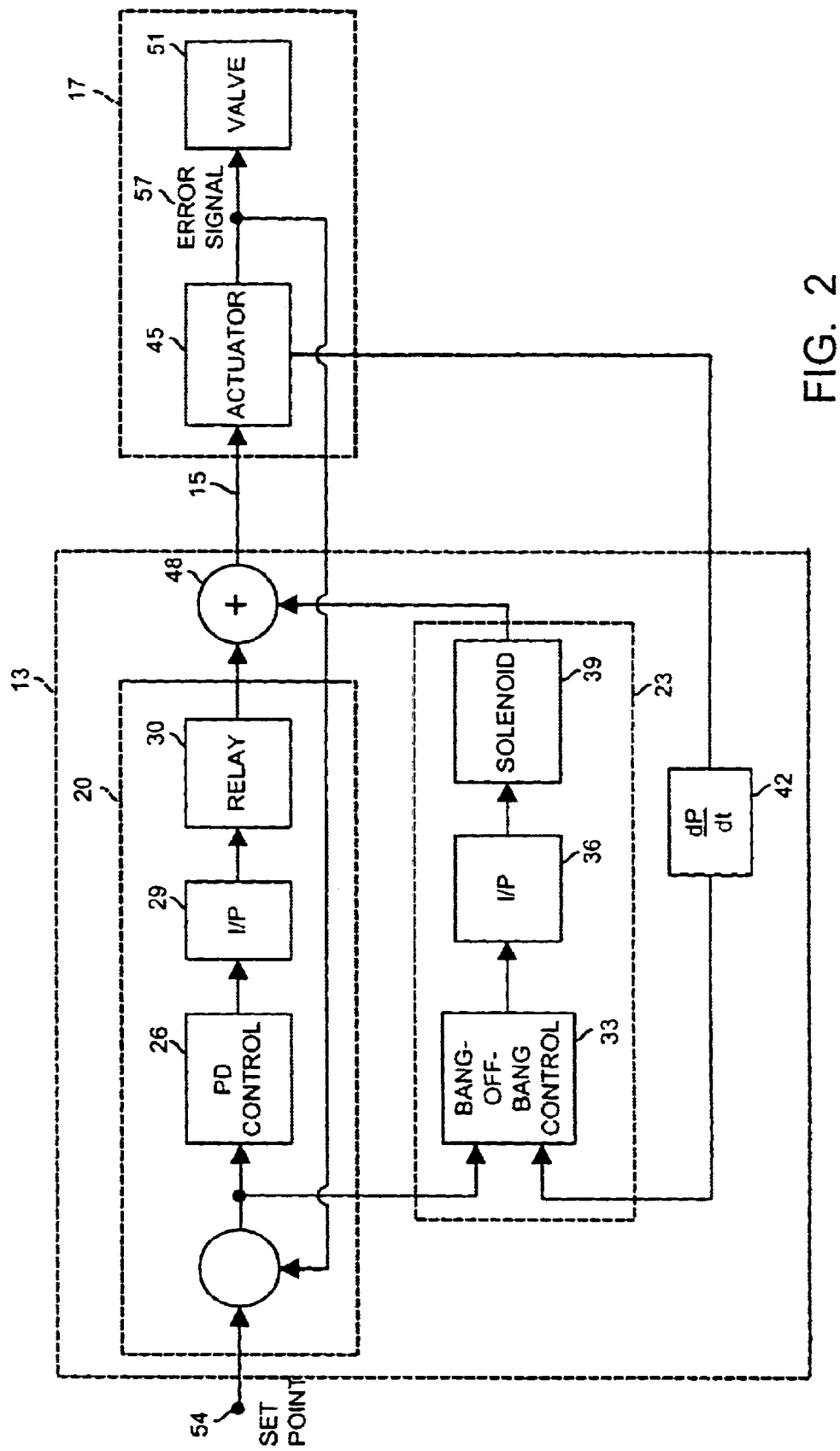
FIG. 2 is a block diagram illustrating the preferred embodiment of the present invention.

As mentioned above, the output of the valve controller 13 may include multiple independent correcting control signals 15 derived from all linear control algorithms, all non-linear control algorithms or a combination of linear and non-linear control algorithms. In one embodiment, as shown in FIG. 2, the valve controller 13 generates two independent correcting control signals including one derived from a linear control generator 20 and another from a non-linear control generator 23. The linear control generator 20, which is located in the valve controller 13, includes a PD type controller 26 coupled to a signal amplifier 29, such as a current to pressure (I/P) transducer, and a pneumatic amplifier 30, such as a pressure relay. As described above, a P, PD, or PDI type control generates a linear correcting control signal from the plurality of control inputs 10. The linear control generator 20 may be implemented by, but not limited to, the configuration used in a Type DVC5000 Digital Valve Controller, manufactured by Fisher Controls International, Inc.

The non-linear control generator 23 includes an "on-off-on" control 33 coupled to a signal amplifier 36 and solenoids 39. The non-linear control generator 23 is implemented by, but not limited to, pulsing two pneumatic solenoids in an "on-off-on" type control 33, which has a duty cycle proportional to an error signal. The signal amplifier 36 includes a current-to-pressure (I-/P) transducer that provides a pressure output in response to a current input. The solenoids 39 provide a pneumatic flow in response to the pressure output of the signal amplifier 36. One solenoid provides a pneumatic supply flow and the second solenoid provides an exhaust flow capability.

During a transition from one set point to another, the non-linear control generator 23 attempts to control a pressure rate 42, which builds or decreases in an actuator 45 located in the valve/actuator plant 17. The pressure rate 42, used for the non-linear control generator 23, may be either fixed or user-defined. As mentioned above, the non-linear control technique compensates for non-linearities such as, but not limited to, friction, dead band, and hysterisis, that are inherent in control valve/actuator plants. The non-linear control generator 23 may be implemented by a modified version of the Type DVC5000 Digital Valve Controller referred to above.

The correcting control signals 15 from the linear control generator 20 and the non-linear control generator 23 are pneumatically summed and integrated to pressure by the load volume of the actuator 45. The pressure rate 42 from the actuator 45 is fed back to the non-linear control algorithm 23 on line 43. An error signal 57 is fed back on line 47 from the valve/actuator plant 17 that adjusts both the linear and non-linear control generators 20, 23, respectively.

In FIG. 2, the two correcting control signals, which are generated by the linear control generator 20 and the non-linear control generator 23, are pneumatically summed and integrated to pressure which, in turn, provides the driving force for the valve/actuator plant 17. The valve/actuator plant 17 includes the actuator 45 coupled to a valve 51. A desired set point signal 54 enters the valve controller 13 to operate the control generators 20, 23. In the linear control generator 20, the PD controller 26 provides an electrical drive signal, which may be, but is not limited to, a current signal. The signal amplifier 29 includes a current-to-pressure (I/P) transducer that provides a pressure output in response to a current input from the PD controller 26. The pneumatic amplifier 30 includes a pressure relay that provides a pneumatic flow to the actuator 45 in response to the pressure output from the signal amplifier 29.

The non-linear control generator 23 is active only when the feedback output signal, which may be the error signal 57 from the actuator 45, is outside a predetermined percent of a set point signal 54. If the output signal is within the predetermined percentage of the set point signal 54, then the non-linear control generator 23 shuts off and the linear control generator 20 continues to bring the output signal of the actuator 45 to within the desired set point signal 54.

Figure 3:
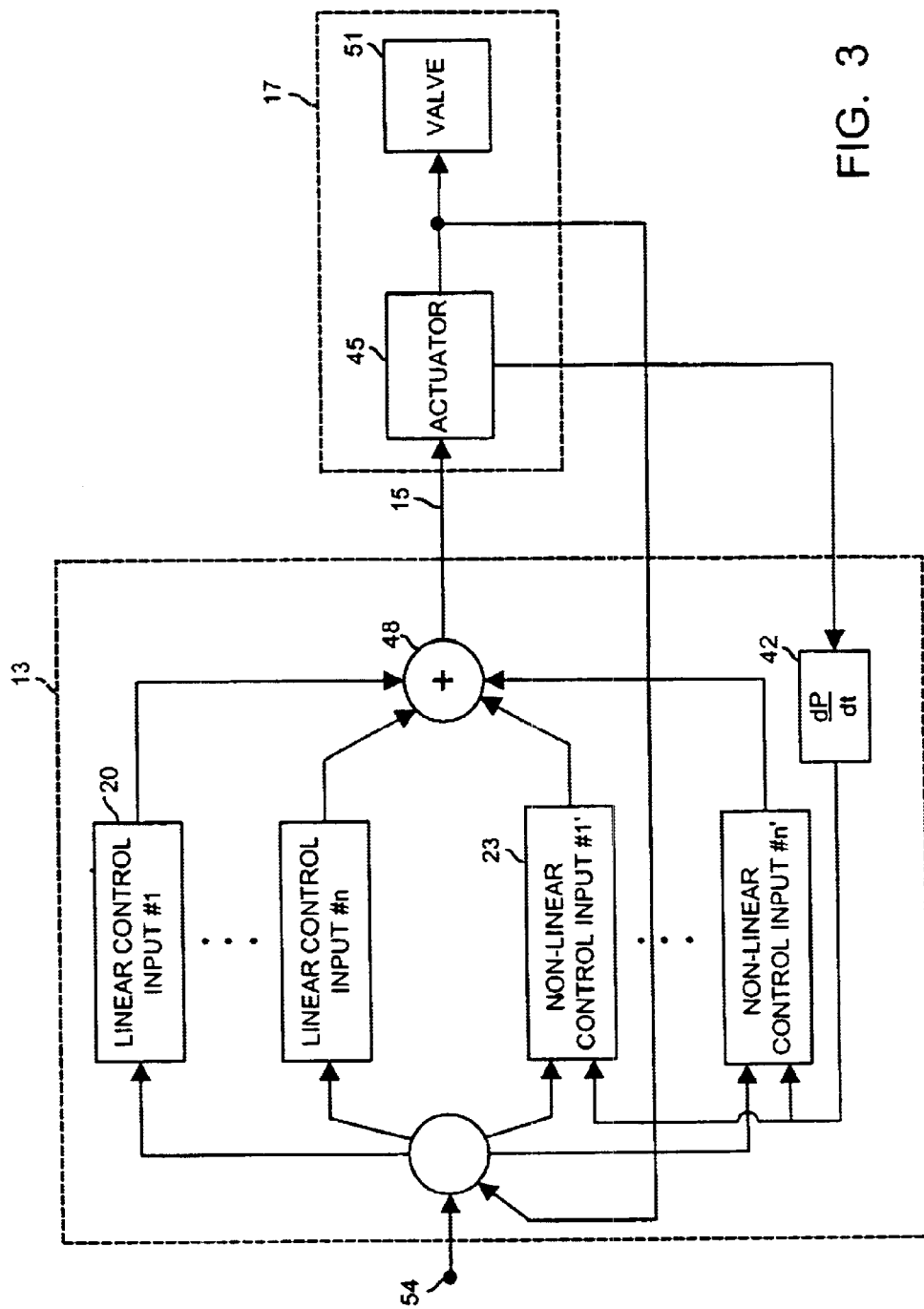
FIG. 3 is a block diagram illustrating an alternate embodiment of the present invention.

FIG. 3 illustrates an alternate embodiment of the present invention, which includes a plurality of independent correcting control signals that may be a combination of linear correcting control signals and non-linear correcting control signals. For example, the valve controller 13 includes, but is not limited to, a combination of linear control generators 20 with correcting control output signals 15/1 through 15/n and non-linear correcting control generators 23 with output signals 15/1' through 15/n'. The correcting control signals consist of, but are not limited to, pneumatic flows and are summed and integrated to pressure by the valve/actuator plant 17.

The foregoing detailed description has been given for clearance of understanding only, and no unnecessary limitations would be understood therefrom, as modifications will be obvious to those skilled in the art.

What is claimed:

1. A method for controlling a valve/actuator plant comprising the steps of:

generating a plurality of independent correcting control signals, each of the plurality of independent correcting control signals being responsive to at least one input signal having a set point signal and being adapted to drive the at least one input signal to the set point; and combining one or more of the plurality of independent correcting control signals into a combined control output.

2. The method of claim 1, wherein the plurality of independent correcting control signals include a pneumatic control signal.

3. The method of claim 1, wherein the plurality of independent correcting control signals are each derived from respective linear control signals.

4. The method of claim 3, wherein the linear correcting control signals are directly proportional to an error signal.

5. The method of claim 3, wherein the linear correcting control signals include a correcting control signal that is proportional to an error signal and a correcting control signal proportional to the rate of change of the error signal.

6. The method of claim 3, wherein the linear correcting control signals include a correcting control signal proportional to an error signal, a correcting control signal proportional to the rate of change of the error signal, and a correcting control signal proportional to the integral of the error signal.

7. A method for controlling a valve/actuator plant comprising the steps of:
  generating a plurality of independent correcting control signals each derived from respective non-linear control signals, and each of the plurality of independent correcting control signals being responsive to at least one input signal having a set point signal; and
  combining one or more of the plurality of independent correcting control signals into a combined control output.

8. The method of claim 7, wherein the non-linear correcting control signal includes a correcting control signal having a duty cycle proportional to an error signal.

9. A method for controlling a valve/actuator plant comprising the steps of:
  generating a plurality of independent correcting control signals derived from a combination of linear control signals and non-linear control signals, and each of the plurality of independent correcting control signals being responsive to at least one input signal having a set point signal; and
  combining one or more of the plurality of independent correcting control signals into a combined control output.

10. An apparatus for controlling a valve/actuator plant comprising:
  a plurality of control generators generating respective independent control signals, each control generator responsive to a respective set point and an input signal associated with the respective set point to provide said respective control signals with each control generator being adapted to drive the respective input signal to the set point; and
  an actuator having a plurality of inputs respectively coupled to each of the respective independent control signals for providing a combined control output in response to one or more of the plurality of independent control signals.

11. The apparatus of claim 10, wherein the plurality of control generators include a plurality of linear control generators.

12. An apparatus for controlling a valve/actuator plant comprising:
  a plurality of non-linear control generators generating respective independent control signals, each control generator responsive to a respective set point to provide said respective control signals; and
  an actuator having a plurality of inputs respectively coupled to each of the respective independent control signals for providing a combined control output in response to one or more of the plurality of independent control signals.

13. An apparatus for controlling a valve/actuator plant comprising:
  a combination of linear control generators and non-linear control generators generating respective independent control signals, each control generator responsive to a respective set point to a provide said respective control signals; and
  an actuator having a plurality of inputs respectively coupled to each of the respective independent control signals for providing a combined control output in response to one or more of the plurality of independent control signals.

* * * * *

UNITED STATES PATENT AND TRADEMARK OFFICE
CERTIFICATE OF CORRECTION

PATENT NO. : 6,644,332 B1
DATED : November 11, 2003
INVENTOR(S) : Richard J. Winkler It is certified that error appears in the above-identified patent and that said Letters Patent is hereby corrected as shown below:

Column 1,
Line 49, please delete "parameter-that" and replace with -- parameter that --.

Column 2,
Lines 60, 64 and 65, please delete "15/n" and replace with -- 15/n --.

Column 3,
Line 9, please delete "15/n" and replace with -- 15/n --.
Line 36, please delete "(I-/P)" and replace with -- (I/P) --.
Line 38, please delete "the:pressure" and replace with -- the pressure --.

Column 4,
Lines 28 and 30, please delete "15/n" and replace with -- 15/n --.

Column 6,
Line 26, please delete "to a provide" and replace with -- to provide --.

Signed and Sealed this

Thirteenth Day of July, 2004

JON W. DUDAS
*Acting Director of the United States Patent and Trademark Office*